United States Patent [19]
Thomas

[11] Patent Number: 6,021,193
[45] Date of Patent: Feb. 1, 2000

[54] TELEPHONE

[75] Inventor: Graham Thomas, Surrey, United Kingdom

[73] Assignee: Nokia Mobile Phones Limited, Espoo, Finland

[21] Appl. No.: 08/880,257

[22] Filed: Jun. 23, 1997

[30]     Foreign Application Priority Data

Jun. 25, 1996 [GB] United Kingdom .................... 9613248

[51] Int. Cl.[7] ........................................... H04M 1/00
[52] U.S. Cl. ..................... 379/387; 379/93.17; 379/396; 345/902
[58] Field of Search ................................... 379/356, 357, 379/354, 355, 396, 387, 93.17, 201; 455/550, 556–558, 411, 412; 345/33, 55, 902

[56]             References Cited

U.S. PATENT DOCUMENTS

| | | | |
|---|---|---|---|
| 5,258,748 | 11/1993 | Jones ........................................ | 345/172 |
| 5,349,629 | 9/1994 | Kumano .................................. | 379/354 |
| 5,363,481 | 11/1994 | Tilt ........................................... | 345/352 |
| 5,371,788 | 12/1994 | Baals et al. ............................. | 379/396 |
| 5,479,476 | 12/1995 | Finke-Anlauff ........................ | 455/450 |
| 5,627,531 | 5/1997 | Posso et al. .............................. | 341/22 |
| 5,774,540 | 6/1998 | Davidson et al. ...................... | 379/387 |

FOREIGN PATENT DOCUMENTS

| | | |
|---|---|---|
| 0557911 A1 | 9/1993 | European Pat. Off. . |
| 2278756 | 12/1994 | United Kingdom . |
| 2293474 | 3/1996 | United Kingdom . |
| WO 93/14589 | 7/1993 | WIPO . |

*Primary Examiner*—Forester W. Isen
*Assistant Examiner*—Jacques Saint-Surin
*Attorney, Agent, or Firm*—Perman & Green, LLP

[57]             ABSTRACT

A telephone having a user interface, comprising user input means; output means; and control means responsive to a first actuation of the user input means to cause subsequent items to be indicated for selection by the output means, and responsive to another actuation of the user input means to select the currently-indicated item. The telephone could be a reduced user interface portable telephone.

3 Claims, 4 Drawing Sheets

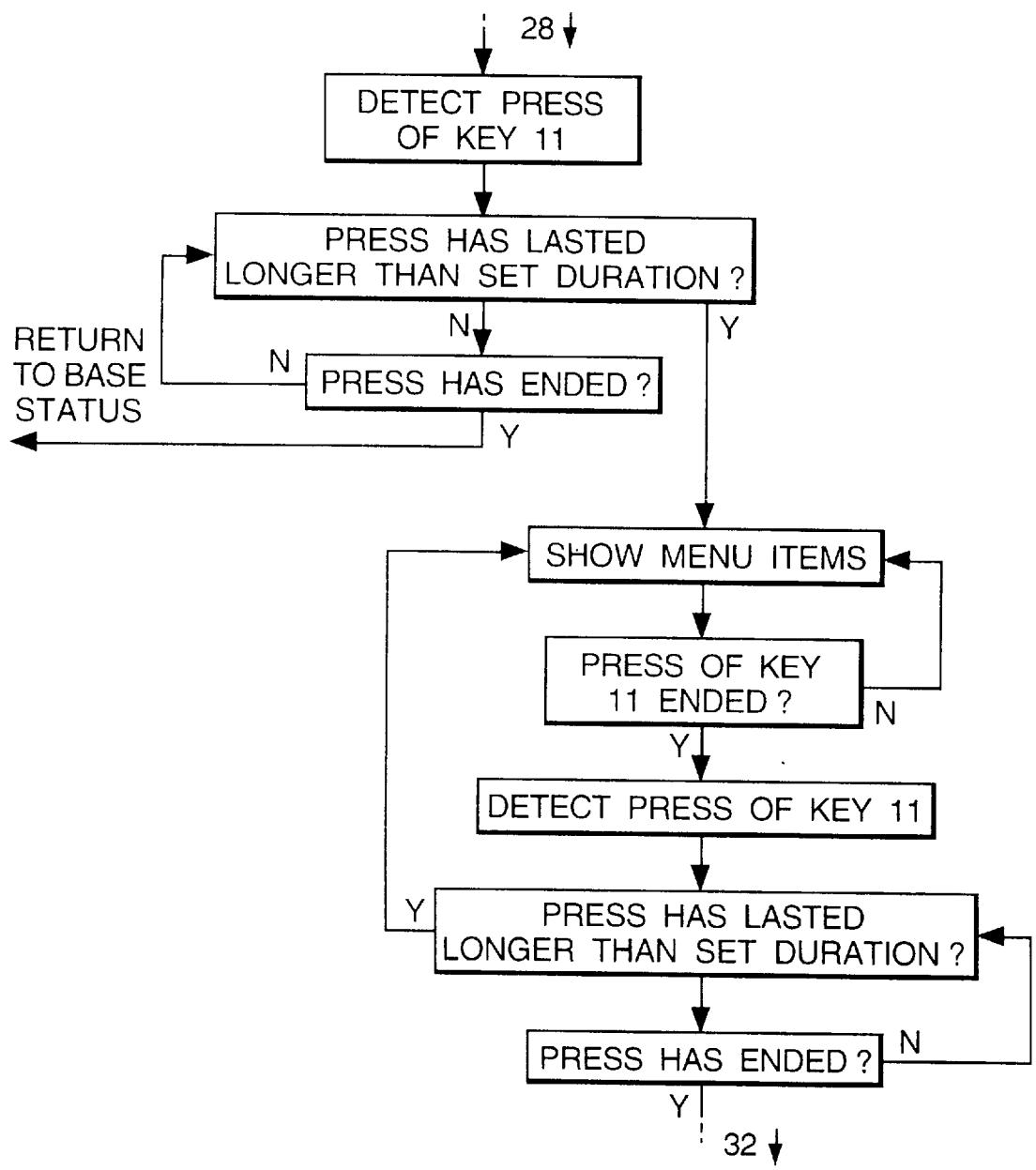

TELEPHONE

BACKGROUND OF THE INVENTION

This invention relates to a telephone having a user interface.

Many portable telephones are controlled through a series of menus. Each menu consists of a series of menu items which can be selected by a user. The selecting of an item controls the telephone, either to cause it to present another menu (for example if the menus are organised in a hierarchical, branching structure) or to control other features of the telephone (for example to begin a telephone call, store information in a memory or increase the telephone's ringing volume). Typically, three keys are provided to allow the user to operate the menu system. One key causes the next menu item to be displayed, another key causes the preceding menu item to be displayed, and the third key is used to select the currently-displayed item.

SUMMARY OF THE INVENTION

According to the present invention from one aspect there is provided a telephone having a user interface, comprising a user input device; an output device; and a control unit responsive to a first actuation of the user input device to cause subsequent items to be indicated by the output device for selection, and responsive to another actuation of the user input device to select the currently-indicated item.

According to the present invention from a second aspect there is provided a method for controlling a telephone, comprising the steps of: detecting a first actuation of a control device and in response indicating subsequent items for selection; and detecting a second actuation of the control device and in response performing an action corresponding to the currently-indicated item.

The first actuation preferably differs from the second actuation. The actuations may be of the same type or different types: for example either actuation may be of a short or a prolonged duration. The actuations may be of different patterns, suitably different patterns of actuation: for instance one or both actuations may comprise one or more (for instance, two or three) actuations of the user input device, preferably with a pause between each actuation. A short actuation is preferably an actuation that is detected by the control unit to last for less than a set duration, for example less than around 0.05 s, 0.1 s, 0.2 s, 0.3 s or 0.5 s. A prolonged actuation is preferably an actuation that is detected by the control unit to last for longer than a set duration, for example around 0.3 s, 0.5 s, 0.8 s or 1.0 s. Each pause may last for, for example, at least around 0.05 s, 0.1 s, 0.2 s or 0.3 s.

Subsequent items of data may preferably be indicated for selection by the items being displayed one-by-one, suitably with a predetermined interval between the displaying of each data item.

The control unit preferably causes subsequent items of data to be displayed for the duration of the first actuation of the input device. The second actuation is suitably a double momentary actuation of the user input device.

Each item is suitably an item of data, most preferably a menu item. The telephone preferably has a data storage means for storing the items and/or for storing data defining action to be taken in response to the selection of each item. The telephone suitably has a relatively reduced user interface. The control means is suitably responsive to the input means alone for navigating a menu system, preferably for advancing through the menu system by causing items to be indicated for selection and/or selecting those items.

The input means is preferably a binary input means, having only two states: an actuated state and a non-actuated state. The input means is preferably a single device, most preferably a pressure-sensitive device, such as a key or button, or a proximity-sensitive device. The input means preferably provides an electrical signal to the control means indicative of its state.

The telephone is preferably a portable telephone, most preferably a hand-portable telephone, and/or a radio telephone.

BRIEF DESCRIPTION OF THE DRAWINGS

The present invention will now be described by way of example with reference to the accompanying drawings, in which:

FIGS. 4 to 6 are flow diagrams illustrating methods of operation of the menu-based user interface.

DETAILED DESCRIPTION OF THE INVENTION

Figure 1:
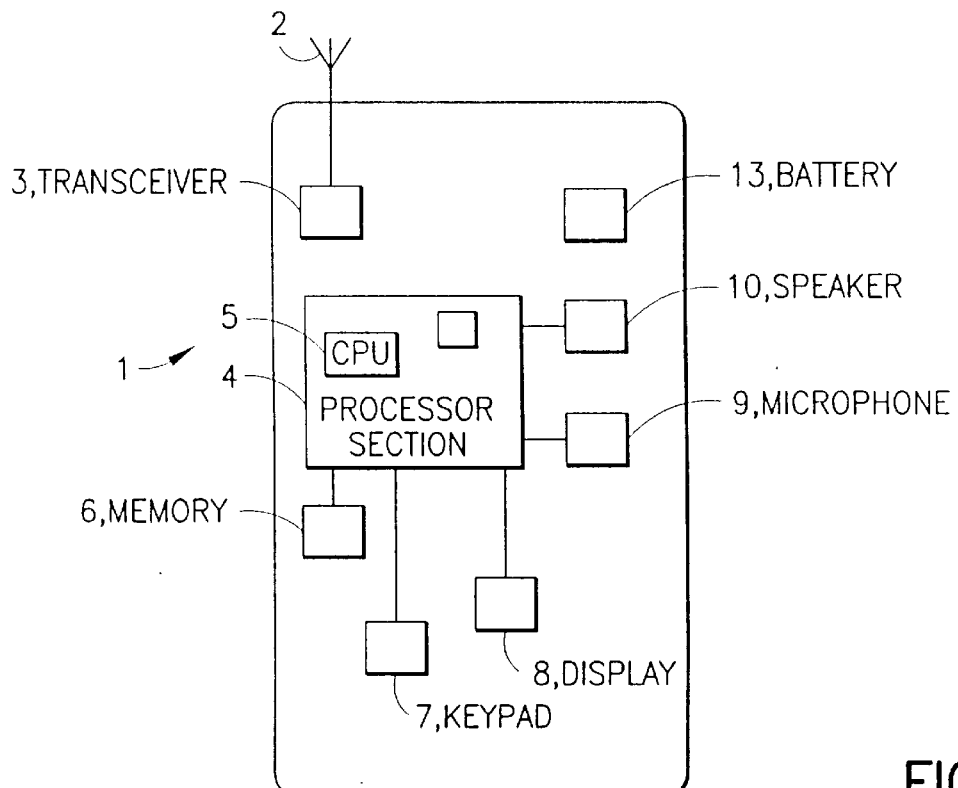
FIG. 1 is a schematic block diagram illustrating a portable telephone having a user interface according to the present invention.
Figure 2:
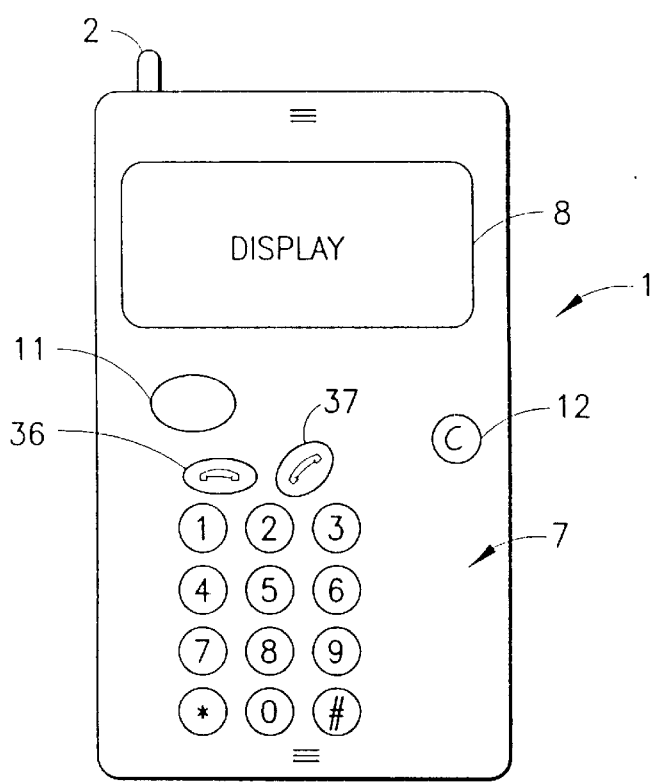
FIG. 2 shows the exterior of the telephone of FIG. 1.

The portable telephone 1 shown in FIGS. 1 and 2 has an antenna 2 connected to a radio transceiver unit 3. A digital processing section 4 including a processor 5 is connected to: the transceiver unit, a memory 6 for storing data for use by the processor, a keypad 7 for providing input to the processor, an LCD display 8 controlled by the processor, a microphone 9 and a speaker 10. The keypad 7 has at least two keys 11, 12. A battery 13 is the source of power for the telephone. The telephone can make telephone calls by radio to a cellular telephone network in the normal way.

Figure 3:
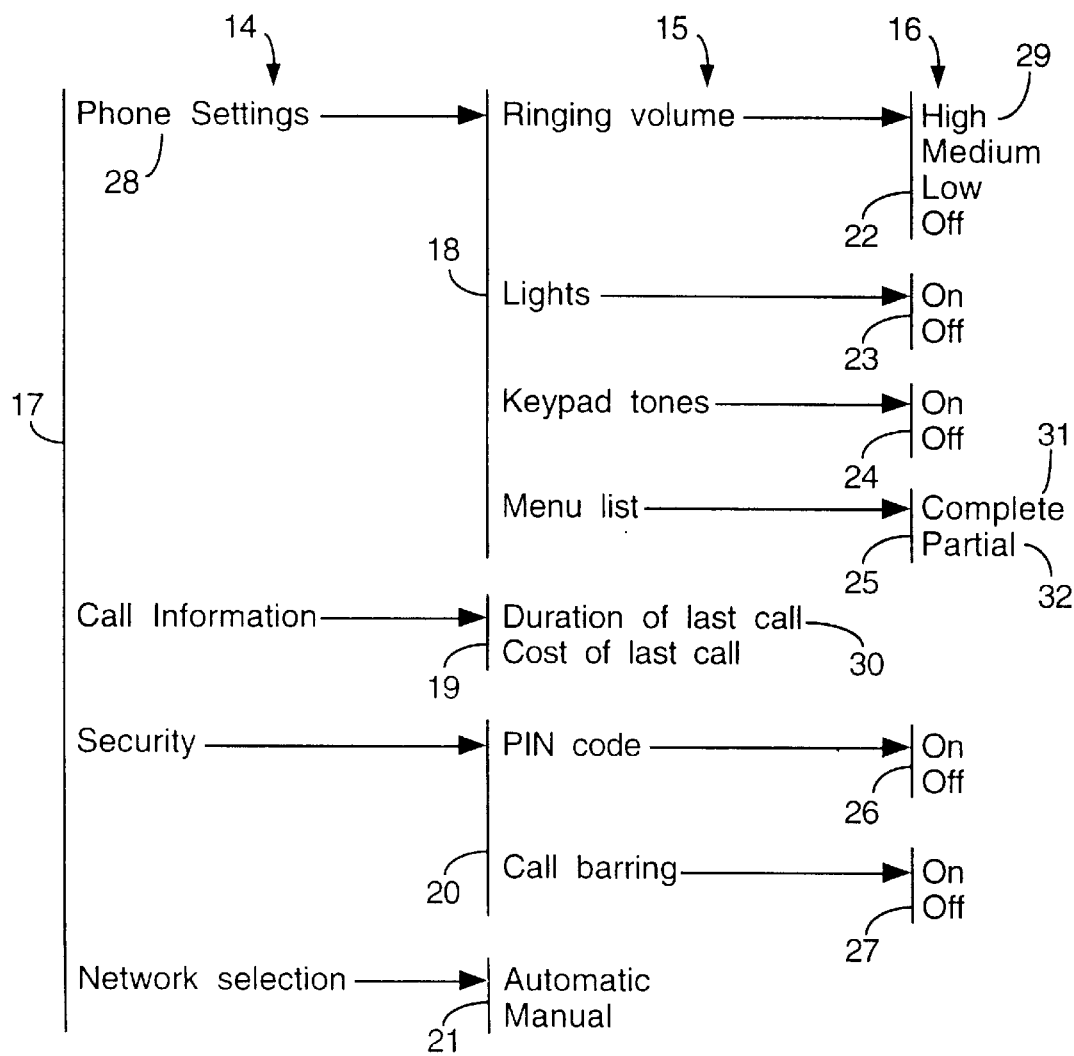
FIG. 3 shows the menu structure of the telephone's menu-based user interface.

The user interface of the telephone is based around the menu structure shown in FIG. 3, and operates under the control of the processor 5. Details of the menu structure are stored in the memory 6. The menu has a hierarchical, branching structure with first, second and third menu levels 14–16 respectively. Each menu level consists of one or more menus 17–27. Each menu consists of one or more menu items, for example items 28–32. A user of the telephone navigates the menu structure by moving from menu to menu, starting from the first menu level. At each menu the user can select menu items of that menu. Selecting an item either: a) causes the processor to control the user interface to present an associated menu at the next lower level (for example selecting item 28 causes menu 18 to be presented), or b) causes the processor to control the telephone's other functions in some way (for example selecting item 29 causes the ringing volume to be set to high, selecting item 30 causes the duration of the last call to be displayed). The menu structure may be varied depending on the status of the telephone (for example whether a call is in progress) or may be controlled by the user (for example by selecting menu items 31 or 32).

The operation of the user interface will now be described with reference to FIG. 4. Initially (for example just after the telephone has been turned on) the user interface is in a "base" status (at 28 in FIG. 4). To cause the menu 17 of the first menu level to be presented the user presses key 11 (29) (this is called the "menu press"). When the processor detects this it controls the display to automatically show the menu items of menu 17 one-by-one on the display (30); so the display shows "Phone Settings", and after a delay "Call Information", and so on. If the end of the menu is reached the menu items are displayed again in the same order. When the user sees the desired menu item displayed he presses key 11 again to select the item that is displayed at the time the key is pressed (31) (this is called the "select press"). The processor then takes the action corresponding to that item (32) (either presenting another menu (33), or controlling other features of the telephone (34)). If another menu item is presented then the processor controls the display to show the title of that menu (35). When the processor then detects another menu press (i.e. another press of key 11) it controls the display to continuously show the menu items of that menu one-by-one, and the process continues. Otherwise, if no other menu is to be presented the processor returns the user interface to the base status. The user interface is also returned to the base status if the processor detects that key 12 is pressed (not illustrated in FIG. 4).

Rather than displaying the title of the new menu (at 35) the processor could branch at 33 directly to displaying items of the new menu (at 30).

In other embodiments the processor can require the menu press to be different from the select press (and, optionally, one or both to be a pre-set type or pattern of press). Suitable options for either press are as follows:

a) a brief press (for example a key press lasting up to 0.5 seconds);

b) a multiple press (for example two brief or momentary presses in close succession);

c) a long press or hold down (for example a press lasting more than 0.5 or 1.0 seconds).

Figure 4:
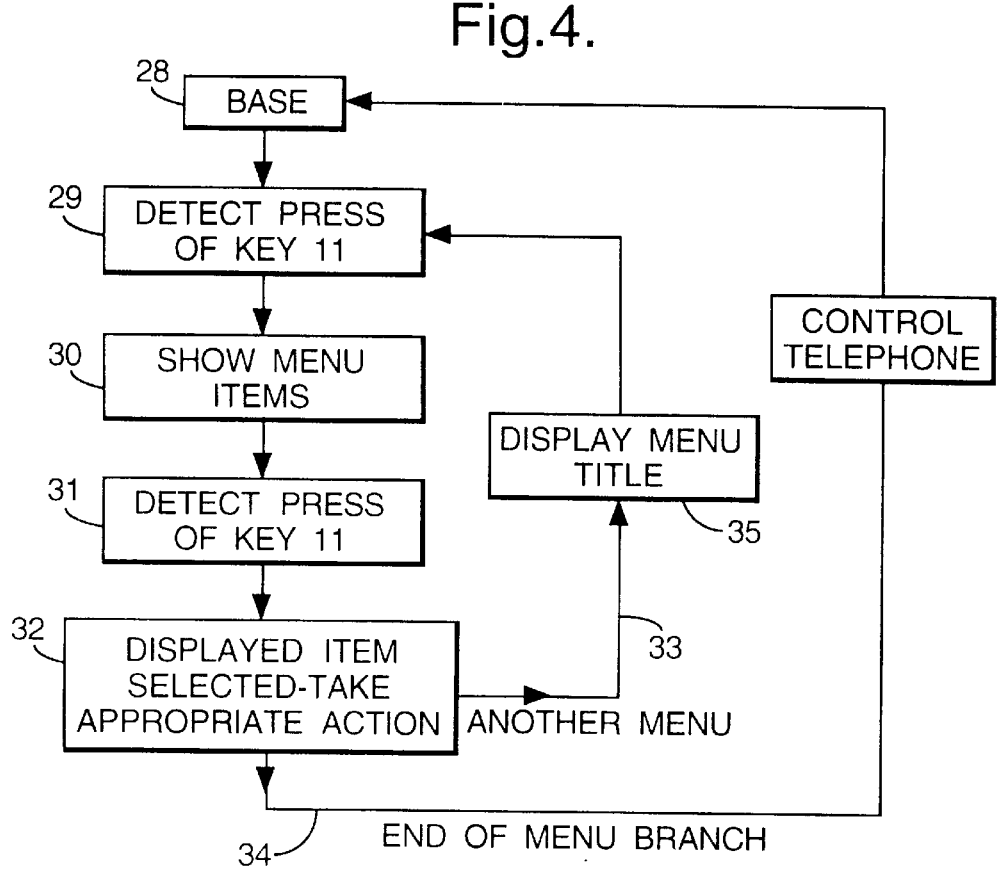
Figure 5:
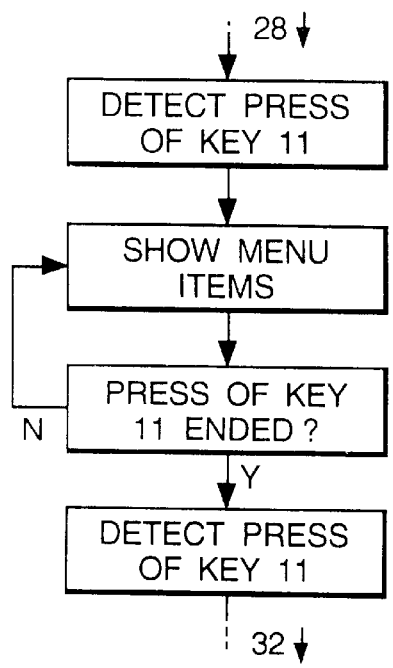

FIGS. 5 and 6 show in more detail two alternative procedures for steps 29 to 31 in FIG. 4. According to the procedure of FIG. 5, once the processor has detected the menu press it causes the display to continue to display successive menu items one by one until it detects that the menu press has ended. The next press of the key 11 is interpreted by the processor as the select press. According to the procedure of FIG. 6, the menu press has to last for longer than a set duration (say 0.8 seconds) and the select press has to last for less than that duration. (An alternative would be for the maximum duration of the select press to be slightly less than the minimum duration of the menu press). Once the processor has detected that a press of key 11 has lasted for longer than the set duration it detects a menu press and causes the display to continue to display successive menu items until that press ends. If the next press also lasts for more than the set duration then it too is interpreted as a menu press and the processor causes the display to resume displaying successive menu items until that press ends. When a press lasts for less than the set duration (or is detected to be of another type/pattern set to act as the select press) it is interpreted as a select press and the processor acts accordingly.

As an alternative, a brief key press could cause the control means to display the only next menu item, and a longer press could cause the currently-displayed item to be selected.

To avoid any need for the key 12, a different pattern of key press of key 11 from the menu and select presses, or a time-out feature (in which a pre-set period is detected since the last key press) may be used to cause the processor to return the user interface to the base state. To reduce the size of the keypad even further the ten numeric keys, the hash and star keys and the on-and off-hook keys 36,37 of the keypad could be removed, so that the telephone had only one control key, and replaced by fourteen corresponding menu items of a "Dial" menu. This menu could then be used (under the control of the single key 11) to designate a telephone number and cause the telephone to dial that number. Alternatively a menu comprising a directory of stored telephone numbers could be used.

An advantage of each of these embodiments is that the means for controlling the user interface can be particularly compact, with fewer keys than the prior art solutions. This is especially useful for relatively small telephones.

As an alternative to showing menu items one-by one the display could indicate successive menu items for selection by, for example, moving a cursor from one item to the next or highlighting successive items or scrolling the menu items relative to a cursor.

Rather than having one or more keys as the input means the telephone could have, for example, one or more touch sensors, sound sensors (actuated by sound) or motion sensors (actuated by motion/acceleration) and/or proximity sensors.

The user interface could be applied to other devices, especially portable electronic devices. The invention is particularly useful for mobile and/or cellular and/or radio phones.

In view of the above description it will be clear to a person skilled in the art that various modifications may be made within the scope of the invention. The invention may include any novel features or combinations of features disclosed herein either explicitly or implicitly and any generalisations thereof irrespective of whether they relate to the invention as claimed or mitigate any of the problems addressed by the invention as claimed.

What is claimed is:

1. A telephone having a series of menus containing individual items representing a variety of telephone functions, said telephone having a user interface for navigating through said menus and items, comprising:

a single user input device constructed to generate a first signal upon a first actuation thereof and a second signal upon a second actuation thereof;

an output device constructed to display the menus and items; and a control unit, constructed to cause the display by the output device of the menus and items in a predetermined order, in response to the first signal from the user input device, and said control unit selecting one of said items to perform the selected telephone function, in response to the second signal from the user input device.

2. A telephone having a series of menus containing individual items representing a variety of telephone functions, said telephone having a user interface for navigating through said menus and items, as described in claim 1 wherein said first signal is different from said second signal in a predetermined pattern and said control unit is constructed to differentiate between said first and second signals by reference to said predetermined pattern.

3. A telephone having a series of menus containing individual items representing a variety of telephone functions, said telephone having a user interface for navigating through said menus and items, as described in claim 1 wherein said first signal is generated by an actuation of the user input device for at least a preset duration, said second signal is generated by an actuation of the user input device for less than said preset duration, and said control unit is constructed to differentiate between said first and second signals by reference to said preset duration.

\* \* \* \* \*